United States Patent
Ai et al.

(10) Patent No.: US 8,176,901 B2
(45) Date of Patent: May 15, 2012

(54) VARIABLE SPEED SUPERCHARGER WITH ELECTRIC POWER GENERATION

(75) Inventors: Xiaolan Ai, Massillon, OH (US); Donald Remboski, Akron, OH (US)

(73) Assignee: The Timken Company, Canton, OH (US)

( * ) Notice: Subject to any disclaimer, the term of this patent is extended or adjusted under 35 U.S.C. 154(b) by 536 days.

(21) Appl. No.: 12/438,288

(22) PCT Filed: Aug. 23, 2007

(86) PCT No.: PCT/US2007/076611
§ 371 (c)(1),
(2), (4) Date: Feb. 20, 2009

(87) PCT Pub. No.: WO2008/024895
PCT Pub. Date: Feb. 28, 2008

(65) Prior Publication Data
US 2010/0050998 A1 Mar. 4, 2010

Related U.S. Application Data

(60) Provisional application No. 60/839,598, filed on Aug. 23, 2006.

(51) Int. Cl.
*F02B 33/00* (2006.01)
(52) U.S. Cl. .......... 123/565; 123/559.1; 417/410.3; 475/183; 60/607
(58) Field of Classification Search .......... 123/559.1, 123/565; 417/410.3; 475/183; 60/607; F02B 33/00
See application file for complete search history.

(56) References Cited

U.S. PATENT DOCUMENTS 661,909 A * 11/1900 Foster .......................... 476/67
1,093,922 A * 4/1914 Dietecich ...................... 476/15
(Continued)

FOREIGN PATENT DOCUMENTS
DE 10 2004 018 420 A1 11/2005
(Continued)

OTHER PUBLICATIONS

International Search Report from corresponding International Application No. PCT/US2007/076611, mailed Jan. 30, 2008.
(Continued)

*Primary Examiner* — John K Kim
(74) *Attorney, Agent, or Firm* — Polster, Lieder, Woodruff & Lucchesi, L.C.

(57) ABSTRACT

A supercharger for boosting intake manifold pressure in an internal combustion engine and producing electrical energy comprises an input shaft (3), a electric machine (50) including a stator (51) and a rotor (53), a compressor (70) including an impeller (71), and a planetary transmission (30) located between the input shaft (3) and the rotor (53) of the electric machine (50) and the impeller (71) of the compressor (70), all such that the input shaft 3 can drive both the impeller (71) and the rotor (53), or the rotor (53) and input shaft (3) can drive the impeller (71). The planetary transmission (30) includes an outer ring (31) operatively coupled to the input shaft (3), a sun member (39) operatively coupled to the impeller (71), planetary clusters (38) located between the outer ring (31) and sun member (39), and a carrier (37) operatively coupled to the planet clusters (38) and the rotor (53). Each planetary cluster (38) comprises an inner roller (35) and an outer roller (33).

10 Claims, 3 Drawing Sheets

U.S. PATENT DOCUMENTS

| | | | | |
|---|---|---|---|---|
| 1,291,654 A * | 1/1919 | Morison | | 476/31 |
| 3,254,546 A * | 6/1966 | Nasvytis | | 475/183 |
| 3,364,761 A * | 1/1968 | Nasvytis | | 476/61 |
| 3,367,214 A * | 2/1968 | Nasvytis | | 475/183 |
| 3,433,099 A * | 3/1969 | Nasvytis | | 475/195 |
| 4,128,016 A * | 12/1978 | Nasvytis | | 476/27 |
| 4,224,840 A * | 9/1980 | Kraus | | 476/9 |
| 5,122,099 A | 6/1992 | Boedo et al. | | |
| 5,947,854 A * | 9/1999 | Kopko | | 475/2 |
| 6,020,657 A * | 2/2000 | Liran | | 307/64 |
| 6,609,505 B2 * | 8/2003 | Janson | | 123/559.1 |
| 2003/0089348 A1 * | 5/2003 | Janson | | 123/559.1 |
| 2004/0023754 A1 * | 2/2004 | Flugrad, Jr. et al. | | 476/50 |
| 2004/0067811 A1 * | 4/2004 | Ai | | 475/183 |
| 2010/0050998 A1 * | 3/2010 | Ai et al. | | 123/565 |

FOREIGN PATENT DOCUMENTS

| | | |
|---|---|---|
| EP | 1 314 884 A2 | 5/2003 |
| GB | 2 390 871 A | 1/2004 |
| GB | 2 398 108 A | 8/2004 |
| JP | 59226752 | 12/1984 |
| JP | 10-266869 | 10/1998 |
| JP | 11294548 | 10/1999 |
| WO | 0221017 A1 | 3/2002 |
| WO | 2004072449 A1 | 8/2004 |
| WO | 2007072196 A2 | 6/2007 |

OTHER PUBLICATIONS

Written Opinion from corresponding International Application No. PCT/US2007/076611, mailed Jan. 30, 2008.

* cited by examiner

VARIABLE SPEED SUPERCHARGER WITH ELECTRIC POWER GENERATION

RELATED APPLICATIONS

This application is the US National Phase under 37 USC §371 of International Application No. PCT/US07/076,611, filed Aug. 23, 2007, which in turn claims priority to U.S. Provisional Application No. 60/839,598 filed Aug. 23, 2006, which is entitled "Variable Speed Supercharger With Electric Power Generation, and which is incorporated herein by reference.

BACKGROUND ART

The increasing demand on fuel efficiency requires engines to provide higher output without increasing total piston displacement and/or weight. One effective way to achieve this is through forced induction systems to boost the intake pressures. More air and thus more fuel can be added to each cylinder. Consequently, more mechanical power is generated from each explosion in each cylinder.

There are two basic types of forced induction systems. One is referred to as supercharger and the other is referred to as turbocharger. The difference between the two systems is their source of energy. Turbochargers are powered by the mass-flow of exhaust gases driving a turbine; superchargers are powered mechanically by belt or chain drives from the engine crankshaft driving a turbine.

In general, superchargers offer a few advantages over turbochargers. The advantages include no turbo lag; they are easy and inexpensive to install; and there is no heat inertia effect in the exhaust system. This makes superchargers the most cost-effective way to increase engine power output.

Conventional superchargers are driven by the engine's crankshaft through a fixed gear ratio. The boost ratio increases with engine speed. At low engine speed, the boost ratio is low and insufficient to provide desired engine torque. There is a strong desire to develop a variable speed supercharger that is capable of delivering optimal boost ratios across the entire spectrum of engine speed, thereby providing additional engine torque even at low engine speeds

SUMMARY OF INVENTION

An electro-mechanical variable speed supercharger combines a supercharger and an alternator in a compact unit to provide fully controllable boost-on-demand supercharging operation across the entire engine speed range and to offer intelligent electric power generation to maintain the battery's state of charge (SOC).

The supercharger includes a three-branch, high-ratio planetary friction drive comprising an outer ring, a sun shaft, and three sets of planetary clusters mounted in a carrier or multiple carriers. The planetary friction drive serves as a power directing device with its three branches each connecting respectively to an input shaft connected to a drive pulley, an electric machine and a compressor. More specifically, the outer ring is operatively connected to the input shaft of the drive pulley, the sun shaft is connected to the impeller of the compressor, and the carrier is, or the carriers are, operatively connected to the electric machine. The supercharger of the current invention has at least three operating modes depending on the operational status of the electric machine for meeting various vehicle performance needs.

In the first mode (called the boosting mode), the electric machine rotates in the opposite direction to the drive pulley. The electric machine is in the motoring state applying shaft torque in the same direction as the speed of rotation. The electric machine draws electric power from a battery system; the friction drive combines the electric power from the electric machine with mechanical power from the drive pulley and delivers the power to the compressor. In the boosting mode, the friction drive provides an increasing speed ratio between the impeller and pulley; thereby boosting engine power as required. Even at relatively low engine speeds, the impeller is able to operate at a higher speed to boost engine torque.

In the second mode (the so-called neutral mode), the electric machine is at rest (zero or very low rotational speed) and generates essentially no electric power. This mode is used when significant engine boosting is not generally required and/or the battery is in its full state of charge. In the neutral mode, the impeller-to-pulley speed ratio is essentially the same as the base speed ratio of the friction drive.

In the third operation mode (the charging mode), the electric machine rotates in the same direction as the drive pulley. The electric machine is in a generating state; and a portion of the mechanical power from the drive pulley is converted to electric power to charge the battery. In the charging mode, the friction drive provides a reduced impeller-to-pulley speed ratio compared with the base speed ratio of the friction drive. The charging mode is used in vehicle high speed cruising, when engine speed is high but torque demand is low.

BEST MODE FOR CARRYING OUT THE INVENTION

Figure 1:
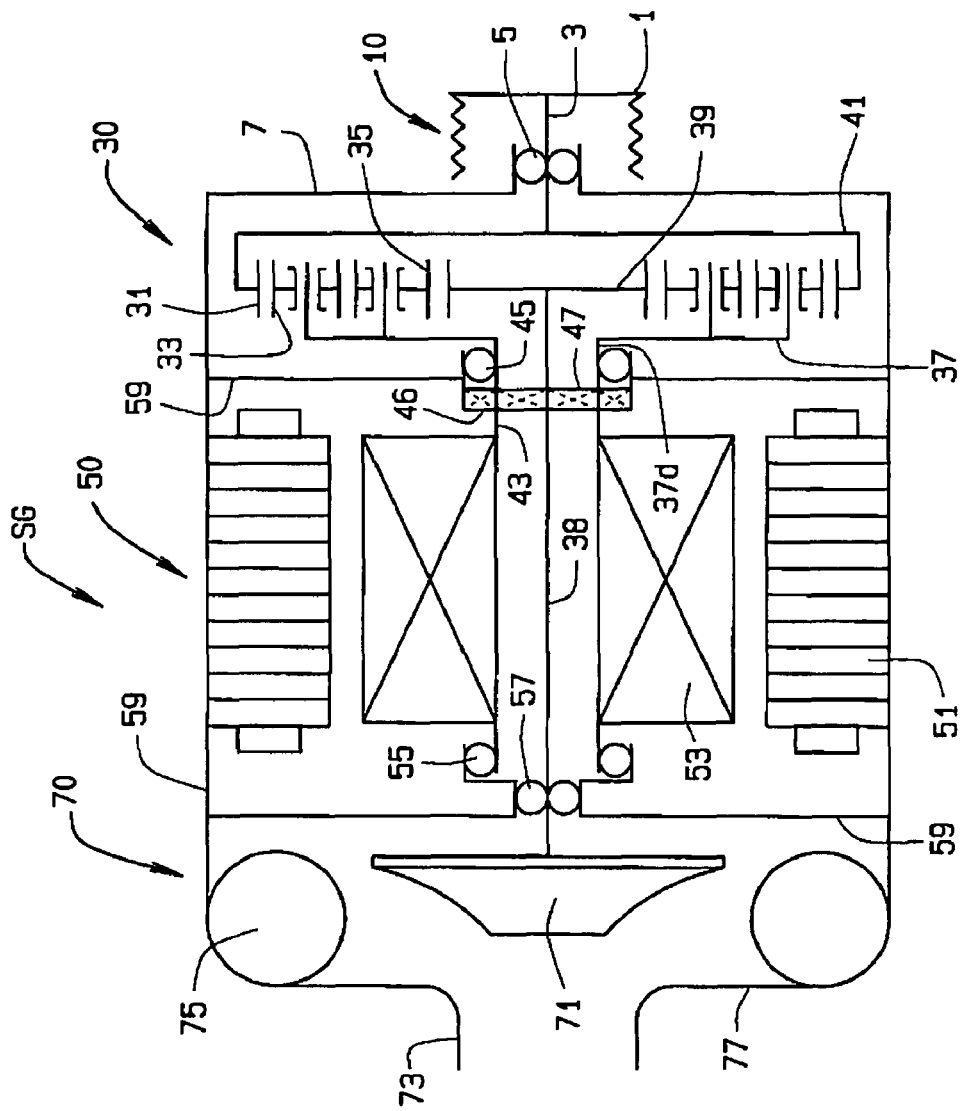
FIG. 1 is a diagrammatic drawing of an illustrative variable speed supercharger of the present invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

An electro-mechanical variable speed supercharger-generator unit SG is shown schematically or diagrammatically in FIG. 1. The supercharger-generator unit comprises a pulley subassembly 10, a friction drive subassembly 30, an electric machine subassembly 50 and a compressor subassembly 70.

The pulley subassembly 10 includes a pulley 1 and a drive or input shaft 3 which is supported by a bearing assembly 5 on a front casing 7 of the supercharger-generator unit. Although the input shaft is described as being driven by the pulley, it will be apparent that the input shaft 3 can be driven by other means.

The friction drive subassembly 30 is comprised of an outer ring 31, a set of planet pairs 33, 35, a planet carrier 37 and a sun shaft 39. The construction of the friction drive subassembly 30 will be discussed in more detail below. The outer ring 31 is operatively coupled to the drive shaft 3 through a drive plate 41.

The electric machine subassembly 50 includes a stator 51 and a rotor 53. The rotor 53 is fixed onto a hollow shaft 43, which in turn is supported through bearings 45 and 55 by a case 59. The hollow shaft 43 is operatively connected to the planet carrier 37 of the friction drive 30.

The compressor subassembly 70 is very similar to compressor designs in turbochargers. It is comprised of a radial flow impeller 71 operatively connected to the sun shaft 39 of the friction 30 drive through a central shaft 38. The compressor subassembly also includes an inlet port 73 and an outlet volute 75. The inlet port 73 and outlet volute 75 are integrated with a back case 77 of the supercharger-generator unit. The central shaft 38, at its end closer to the impeller 71, is supported in the case 59 through a bearing 57. As the impeller 71 spins at high speeds, air is drawn from the inlet port 73 and pushed out through the outlet volute 75 at increased pressure.

Figure 2:
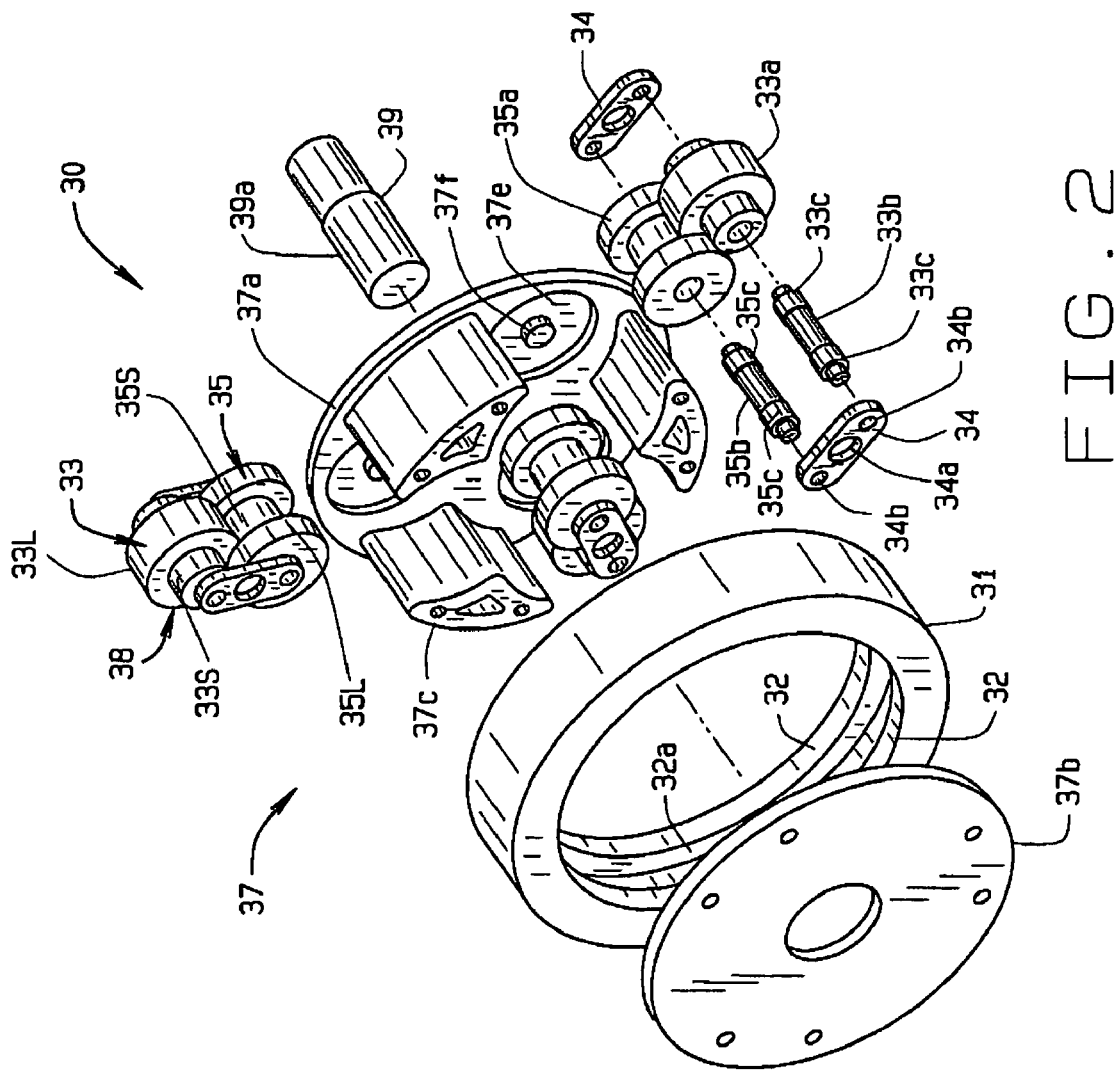
FIG. 2 is a perspective exploded view of a planetary friction drive of the supercharger.
Figure 3:
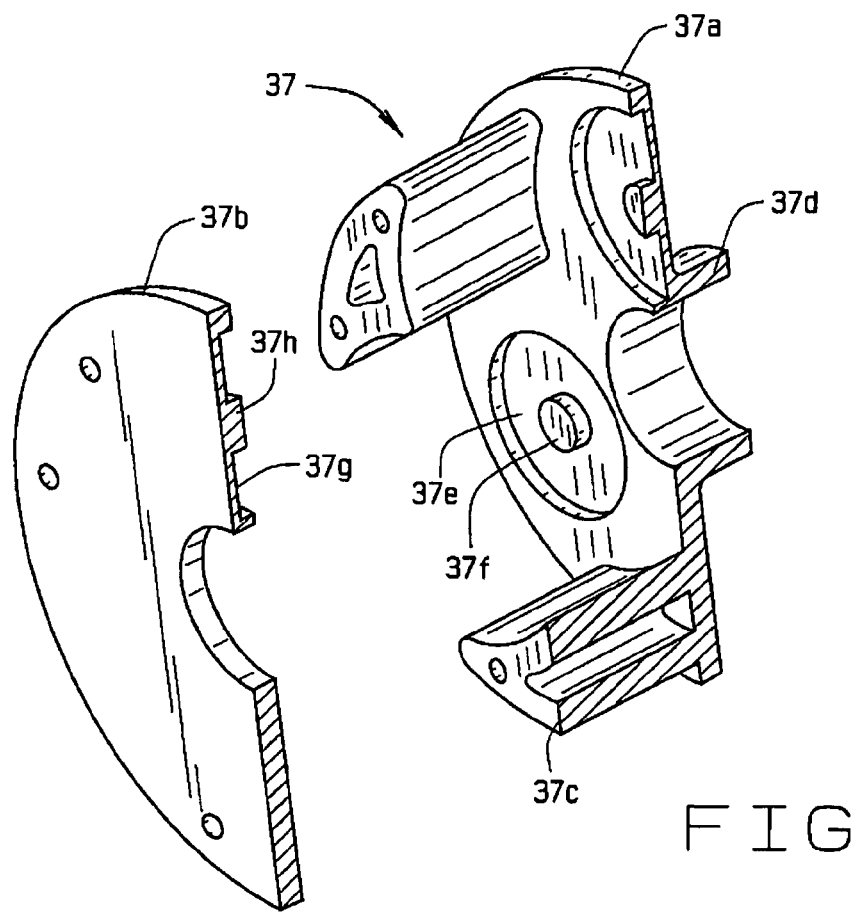
FIG. 3 is a perspective sectional view of a carrier of the planetary friction drive.

The friction drive subassembly 30 is shown in detail in FIGS. 2 and 3. The friction drive 30 features stepped planet rollers 33,35 for high ratio, and a unique planet pairing arrangement for torque actuated self-loading. The friction drive 30 has a set of planet roller pairs or clusters 38. Each planet roller pair 38 is comprised of a first (inner) planet roller 35 and a second (outer) planet roller 33, each having a large cylindrical surface 33L,35L and a small cylindrical surface 33S, 35S. The small cylindrical surface of the first planet roller 35 is in frictional contact with the large cylindrical surface of the second planet roller 33. The two planet rollers 35, 33 in the pair 38 are supported through bearings (33c, 35c) and pin shafts (33b, 35b) on a pair of brackets 34. As seen, the brackets 34 are generally elongate and have mounting holes 34a centered generally along the length of the bracket and pin shaft receiving holes 34b near the opposite ends of the brackets. A pair of opposed brackets 34 are used for each roller pair 38.

The planet carrier 37 (FIG. 3) comprises a carrier base 37a and a carrier plate 37b. The carrier base 37a has a set of bridges 37c for connecting with the carrier plate 37b. It also has a sleeve 37d for coupling with hollow shaft 43 of the electric machine such that the carrier 37 is operatively connected to the rotor 53 of the electric machine 50. On both the carrier base 37a and carrier plate 37b there are recesses 37e and 37g and studs 37f and 37h located in the recesses generally at the center thereof. The bracket holes 34a receive the studs 37f,h such that the brackets 34 are supported on studs 37f and 37h (FIG. 3) of the planet carrier 37. The brackets 34 along with the planet pairs 38 are free to rotate about the axis of the studs 37h.

The sun shaft 39 has an outer cylindrical surface 39a which is in frictional contact with the large cylindrical surface 35L of the first planet roller 35. The outer ring 31 has an inner cylindrical surface 32 which is in frictional contact with the small cylindrical surface 33S of the second planet roller 33. In the illustrative outer ring shown, the inner cylindrical surface 32 is segmented in the axial direction by a groove 32a.

Assuming that (1) the ratio of the outer diameter of the large cylindrical surface 35 to the small cylindrical surface 35S of the first (inner) planet roller 35 is $F_1$, (2) the ratio of the outer diameter of large cylindrical 33L surface to the small cylindrical surface 33S of the second (outer) planet roller 33 is $\Phi_2$, and (3) the ratio of the diameter ($R_r$) of the inner cylindrical surface 32 of the outer ring 31 to the diameter ($R_s$) of the outer cylindrical surface 39a of sun shaft 39 is $K_0$, then the base speed ratio (K) of the friction drive 30 is the product of the three ratios (i.e., $K=\Phi_1\Phi_2 K_0$). That is, $$K = \phi_1 \phi_2 K_0, \text{ where}$$

$$\phi_1 = \frac{R_{p1\_out}}{R_{p1\_in}}$$

$$\phi_2 = \frac{R_{p2\_out}}{R_{p2\_in}}$$

$$K_0 = \frac{R_r}{R_s}$$

where $R_{p1\_out}$=radius of the large cylindrical surface 35L of the first planet roller 35;

$R_{p1\_in}$=radius of the small cylindrical surface 35S of the first planet roller 35;

$R_{p2\_out}$=radius of the large cylindrical surface 33L of the second planet roller 33;

$R_{p2\_in}$=radius of the small cylindrical surface 33S of the second planet roller 33;

$R_r$=radius of the inner cylindrical surface 32 of the outer ring 31; and $R_s$=radius of the outer cylindrical surface 39a of the sun shaft 39.

As one can see, with the stepped rollers 33,35, the base speed ratio of the friction drive is increased by a factor (F) that is a product of the ratios of the small and large cylindrical surfaces 33S,L, 35S,L of the rollers 33, 35 (i.e., $F=\Phi_1\Phi_2$).

Figure 4:
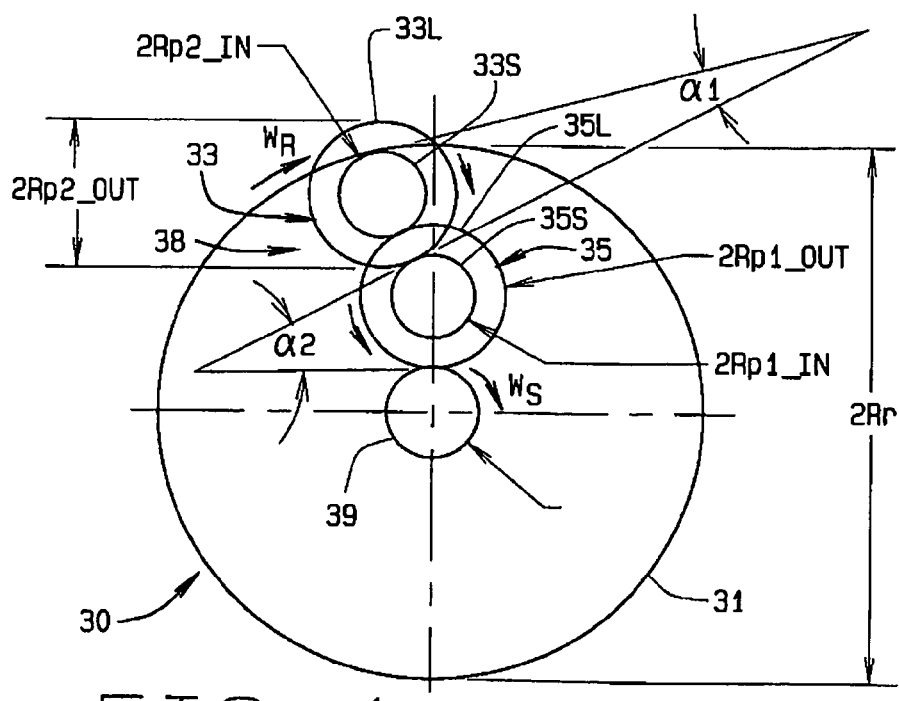
FIG. 4 is a schematic drawing of the planetary friction drive depicting the torque actuated self-loading mechanism of the friction drive.

FIG. 4 depicts the torque actuated self-loading mechanism. As the pulley 1 drives the outer ring 31 (by way of the input shaft 3) in the direction indicated by $w_R$, it turns the sun shaft in the same direction as indicated by $w_S$. Now consider a planet roller pair 33,35 in the friction drive assembly 30. The friction forces exerted on the first planet roller 35 by the sun shaft 39 and on the second planet roller 33 by the outer ring 31 form a couple, which tends to rotate the planet roller pair 38 about the axis of supporting studs 37f,h between the sun shaft 39 and the outer ring 41. Since the outermost distances between the large cylindrical surface 35L of the first planet roller 35 and the small cylindrical surface 33S of the second planet roller 33 is greater than the annular gap between the inner cylindrical surface 32 of the outer ring 31 and the outer cylindrical surface 39a of the sun shaft 39 (i.e., $2R_{p1\_out}+2R_{p2\_in}>2R_s+2R_r$), a wedge action is created. The wedge action produces substantial normal contact load at the frictional contacts between the elements of the friction drive 30.

There are two wedge angles formed in the frictional drive 30: one between the outer ring 31 and the first planet roller 35 for the second planet roller 33 as denoted by α1 and a second between the sun shaft 39 and the second planet roller 33 for the first planet roller 35 as denoted by α2 in FIG. 4. As seen in FIG. 4, the angles α1 and α2 are defined by lines tangential to the contact points between (1) the outer roller 33 and the outer ring 31; (2) the outer roller 33 and the inner roller 35; and (3) the inner roller 35 and the sun shaft 39. To prevent excessive slippage at frictional contacts, the following geometrical conditions are required:

$$\tan\left(\frac{\alpha_1}{2}\right) \le \mu \text{ and}$$

$$\tan\left(\frac{\alpha_2}{2}\right) \le \mu,$$

where μ is the maximum available friction coefficient at the frictional contact.

The friction drive so constructed has three concentric rotation members: the outer ring member 31, the planet carrier member 37 and the sun shaft member 39. They form a three-branch system, having two degrees of freedom. The first branch is the sun shaft member 39, which is operatively connected to impeller 71. The second branch is the outer ring member 31, which is operatively connected to the drive or input shaft 3, and the third branch is the planet carrier member 37 which is operatively connected to the electric machine 50. The speed of impeller 71 is determined by the speed of the drive pulley 1 (and hence of the input shaft 3) and the speed of the rotor 53 of the electric machine 50. Thus, for a given pulley speed which is proportional to engine speed, the speed of the impeller 71 can be adjusted by the electric machine 50 to meet boosting requirements.

To ensure that the friction drive 30 operates at elevated speeds, a circulating lubrication and cooling system may be required. The circulating lubrication system would include an internal oil pump that pumps lubrication to the sun shaft 39, an inlet and an outlet for directing lubricant in and out of the friction drive housing, a filter for trapping debris within the system to prevent surface damage, and a heat exchanger and/or a reservoir for cooling and storing the lubricant. An external scavenging pump may be an option to prevent excessive lubricant build-up inside of the friction drive. Seals 46 and 47 (FIG. 1) prevent lubricant and contaminants from migrating along the hollow shaft 43 and along the central shaft 38.

In the first or boost mode, the electric machine 50 functions as a motor and draws current from the battery that it might otherwise charge. The rotor 53 revolves and rotates the carrier 37. The outside or second planet roller 33 rolls along the cylindrical surface 32 of the outer ring 31 and drives the inner or first planet roller 35 at a higher angular velocity. The first planet roller 35 in turn drives the sun shaft 39 at an even greater angular velocity. While the planet carrier 37 rotates in the direction opposite to that of the outer ring 31, the sun shaft 39 rotates in the direction of the outer ring 31. In any event, the sun shaft 39 rotates at an angular velocity considerably greater than the outer ring 31 that is driven by the pulley 1 via the input shaft 3. The sun shaft 39, being operatively connected to the impeller 71, drives the impeller 71 at the higher angular velocity, providing a significant boost in pressure within the intake manifold of the internal combustion engine. By controlling the current delivered to the electric machine 50, one can control the speed of the impeller 71 and the magnitude of the boost that it provides.

In the second or neutral mode, the rotor 53 of the electric machine 50 remains essentially stationary and so is the carrier 30 of the friction drive 30, inasmuch as the rotor 53 and carrier 37 are connected directly together. The outer ring 31, which is connected directly to the pulley 1, rotates at the speed of the pulley 1. The outer ring 31 rotates the second or outer planet roller 33, which in turn rotates the first or inner planet roller 35 at a greater angular velocity; and the inner planet roller 35 rotates the sun shaft 39 at a still greater angular velocity—and the impeller 71 revolves at the velocity of the sun shaft 39. But the increased angular velocity is not nearly as great as in the boost mode. Even so, the engine does receive a boost in manifold pressure.

In the third or charging mode, the rotor 53 imparts resistance to the carrier 37, and the carrier 37 is driven by the pulley 1 which transfers power through the friction drive 30 to the rotor 53. More specifically, the pulley 1 turns the outer ring 31 at the velocity of the pulley 1. The outer ring 31 rotates the outer planet roller 33, which rotates the inner planet roller 35, which in turn rotates the sun shaft 39 and the impeller 71 connected to it. The impeller 71 may rotate at a relatively slow angular velocity—indeed the speed ratio of impeller to pulley is considerably smaller than it is in the boost mode or even the neutral mode. The carrier 37 rotates in the direction of the outer ring 31 and sun shaft 39. The rotor 53 of the electric machine 50 reverses and the electric machine 50 becomes a generator. The speed at which the carrier 37 revolves, which is the speed the rotor 53, and likewise the speed at which the sun shaft 39 and impeller 71 rotate can be controlled by controlling the current delivered by the electric machine 50.

The friction drive 30 has utility beyond transmitting power to and from the electric machine 50, that is to say, it may be used to transfer power in applications that do not require or use the electric machine 50.

As various changes could be made in the above constructions without departing from the scope of the invention, it is intended that all matter contained in the above description or shown in the accompanying drawings shall be interpreted as illustrative and not in a limiting sense.

The invention claimed is:

1. A supercharger for boosting intake manifold pressure in an internal combustion engine and producing electrical energy, said supercharger comprising:
    an input shaft;
    an electric machine including a stator and a rotor;
    a compressor including an impeller;
    a planetary transmission coupling the input shaft, the rotor of the electric machine, and the impeller of the compressor, such that the input shaft can drive both the impeller and the rotor, or the rotor and input shaft can drive the impeller;
    wherein the planetary transmission includes an outer ring operatively coupled to the input shaft, a sun member operatively coupled to the impeller, planetary clusters located between the outer ring and sun member, and a carrier operatively coupled to the planet clusters and the rotor;
    wherein said planetary clusters each comprise an inner roller and an outer roller in frictional engagement with each other, said inner roller further in frictional engagement with said sun member, and said outer roller further in frictional engagement with said outer ring;
    wherein a base speed ratio (K) of the planetary transmission equals $\phi_1\phi_2 K_0$, wherein,
    $\phi_1$ is the ratio of the outer diameter of the large cylindrical surface to the small cylindrical surface of the inner planet roller;
    $\phi_2$ is the ratio of the outer diameter of large cylindrical surface to the small cylindrical surface of the outer planet roller; and
    $K_0$ is the ratio of the diameter of the inner cylindrical surface of the outer ring to the diameter of the outer cylindrical surface of sun shaft.

2. The supercharger of claim 1 wherein mechanical power supplied to the input shaft can drive both the impeller and the rotor to generate electrical power, or electrical power supplied to the electric machine, together with mechanical power supplied to the input shaft can drive the impeller;

wherein each roller in said planetary clusters includes a small diameter section and a large diameter section;

wherein the small diameter section of said inner roller is frictionally engaged with the large diameter section of said outer roller;

wherein the large diameter section of said inner roller is frictionally engaged with an outer cylindrical surface of the sun member; and wherein the small diameter section of said outer roller is frictionally engaged with an inner cylindrical surface of the outer ring.

3. The supercharger of claim 1 wherein the supercharger is operable in three modes: a boosting mode, a neutral mode and a charging mode;

wherein, in the boosting mode, the electric machine and the input shaft rotate in opposite directions such that they both drive the impeller through the planetary drive;

such that the planetary drive combines the electric power from the electric machine with mechanical power from the input shaft to deliver power to the compressor;

whereby, the planetary drive provides an increasing speed ratio between the impeller and input shaft; thereby boosting engine power as required, and even at relatively low engine speeds, the impeller is able to operate at a higher speed to boost engine torque;

in the neutral mode the impeller is powered solely by the input shaft through the planetary drive; and in the charging mode the electric machine rotates in the same direction as the input shaft, such that the electric machine is in a generating state;

whereby a portion of the mechanical power from the input shaft is converted to electric power in the charging mode; and wherein, the planetary drive provides a reduced impeller to input shaft speed ratio compared with the base speed ratio of the planetary drive.

4. A supercharger for boosting intake manifold pressure in an internal combustion engine and producing electrical energy, said supercharger comprising:

an input shaft, an electric machine including a stator and a rotor;

a compressor including an impeller;

a planetary transmission coupling the input shaft, the rotor of the electric machine, and the impeller of the compressor, said planetary transmission configured such that the input shaft can drive both the impeller and the rotor, or the rotor and input shaft can drive the impeller;

wherein the planetary transmission includes an outer ring operatively coupled to the input shaft, a sun member operatively coupled to the impeller, planetary clusters located between the outer ring and sun member, and a carrier operatively coupled to the planet clusters and the rotor;

wherein the planetary clusters each comprise an inner roller and an outer roller in frictional engagement with each other; said inner roller further being in frictional engagement with said sun member and said outer roller further being in frictional engagement with said outer ring;

wherein said planetary clusters define in combination with said sun member and said outer ring define three tangential lines as follows:

a first line tangential to a point of contact between said outer ring and the outer planet roller;

a second line tangential to a point of contact between said outer planet roller and said inner planet roller;

a third line tangential to a point of contact between said inner planet roller and said sun shaft; and wherein said three lines define two wedge angles, $\alpha 1$ and $\alpha 2$, with $\alpha 1$ being defined by the intersection of the first and second lines, with $\alpha 2$ being defined by the intersection of the second and third lines, and wherein $\alpha 1$ and $\alpha 2$ satisfy the following geometrical conditions:

$$\tan\left(\frac{\alpha_1}{2}\right) \le \mu$$

$$\tan\left(\frac{\alpha_2}{2}\right) \le \mu$$

wherein $\mu$ is the maximum available friction coefficient at the frictional contact.

5. The supercharger of claim 4 wherein said inner and outer rollers are mounted on a bracket mounted in said carrier.

6. The supercharger of claim 5 wherein said bracket, with said inner and outer rollers mounted thereto, is rotatable relative to said carrier about a central axis of the bracket.

7. The supercharger according to claim 4 wherein the planetary transmission utilizes a friction drive and includes a torque-actuated, self-loading mechanism.

8. A friction drive comprising:

an outer ring;

a sun shaft located within the outer ring;

at least one planet roller cluster coupled between said sun shaft and said outer ring, said planet roller cluster having an outer planet roller and an inner planet roller each axially supported on a pair of opposed brackets;

said outer planet roller having a small diameter section and a large diameter section, said outer planet roller in frictional engagement with the outer ring at said small diameter section;

said inner planet roller located between, and contacting only, the associated outer planet roller in said roller cluster and the sun shaft, said inner planet roller having a small diameter section in frictional engagement with said large diameter section of said associated outer planet roller and a large diameter section in frictional engagement with said sun shaft;

a carrier including a carrier plate located along the ends of the planet rollers, said carrier plate including a supporting stud for each adjacent planet cluster bracket, whereby said planet cluster bracket and said associated planet rollers are free to rotate about an axis of the supporting stud parallel to an axis of said sun shaft such that said frictional engagement is maintained between the planet rollers and the outer ring and sun shaft irrespective of the direction of rotation; and wherein a base speed ratio (K) between said outer ring and said sun shaft equals $\phi_1 \phi_2 K_0$, wherein, $\phi_1$ is the ratio of the outer diameters of the large and small diameter sections of the inner planet roller;

$\phi_2$ is the ratio of the outer diameters of large and small diameter sections of the outer planet roller; and $K_0$ is the ratio of the diameter of an inner cylindrical surface of the outer ring to an outer diameter of said sun shaft.

9. The friction drive of claim 8 wherein $2R_{p1\_out}+2R_{p1\_in}+2R_{p2\_out}+2R_{p2\_in}>2R_s-2R_r$, wherein $R_{p1\_out}$ is the radius of the larger diameter portion of the inner planet roller;

$R_{p1\_in}$ is the radius of the smaller diameter portion of the inner planet roller;

$R_{p2\_out}$ is the radius of the larger diameter portion of the outer planet roller;

$R_{p2\_in}$ is the radius of the smaller diameter portion of the outer planet roller;

$R_s$ is the radius of the sun shaft; and $R_r$ is the inner diameter of the outer ring.

10. The friction drive of claim 8 wherein said inner planet roller and said outer planet roller in said planet roller cluster are each supported on an associated axial pin shaft; and wherein said pair of opposed brackets secures each of said associated axial pin shafts in a parallel relationship within said planet roller cluster.

* * * * *